United States Patent
Hofmeister (10) Patent No.: US 7,606,500 B2
(45) Date of Patent: Oct. 20, 2009

(54) SCALABLE TRANSCEIVER BASED REPEATER

(75) Inventor: Ruldolf J. Hofmeister, Escondido, CA (US)

(73) Assignee: Finisar Corporation, Sunnyvale, CA (US)

( * ) Notice: Subject to any disclaimer, the term of this patent is extended or adjusted under 35 U.S.C. 154(b) by 372 days.

(21) Appl. No.: 10/909,614

(22) Filed: Aug. 2, 2004

(65) Prior Publication Data

US 2005/0244165 A1    Nov. 3, 2005

Related U.S. Application Data

(60) Provisional application No. 60/566,664, filed on Apr. 30, 2004.

(51) Int. Cl.
*H04B 10/02* (2006.01)
(52) U.S. Cl. .................... 398/175; 398/83; 398/135; 398/155
(58) Field of Classification Search ............ 398/173, 398/174, 175, 176, 177, 178, 179, 180, 181, 398/135, 139, 83, 117, 155
See application file for complete search history.

(56) References Cited

U.S. PATENT DOCUMENTS

| 5,767,999 A * | 6/1998 | Kayner | 398/164 |
| 6,272,154 B1 * | 8/2001 | Bala et al. | 370/535 |
| 6,529,303 B1 * | 3/2003 | Rowan et al. | 398/82 |

* cited by examiner

*Primary Examiner*—Christina Y Leung
(74) *Attorney, Agent, or Firm*—Workman Nydegger (57) ABSTRACT

Systems and methods for repeating optical signals. A scalable transceiver based repeater includes one or more transceivers. Each transceiver includes an optical receiver that receives a channel of an optical signal. The optical transmitter in each transceiver transmits the channel received by the associated optical receiver. A switch is used to redirect the channels, which may be in an electrical form at the switch, from the optical receivers back to the optical transmitters. The switch can also be used to add/drop the channels from the repeater. The optical transmitter and/or the optical receiver of each transceiver may also include a clock/data recovery circuit (CDR). The repeater is scalable because transceivers can be added/replaced as needed. A demultiplexor can separate an optical signal into the channels that are received by the optical receivers. A multiplexor combines the channels generated by the optical transmitters.

17 Claims, 4 Drawing Sheets

SCALABLE TRANSCEIVER BASED REPEATER

CROSS-REFERENCE TO RELATED APPLICATIONS

This application claims the benefit of U.S. Provisional Application No. 60/566,664, filed Apr. 30, 2004, and entitled SCALABLE TRANSCEIVER BASED REPEATER, which is hereby incorporated by reference.

BACKGROUND OF THE INVENTION

1. The Field of the Invention

The present invention relates to the transmission of optical signals in a network. More particularly, the present invention relates to optical repeaters and more specifically to scalable transceiver based optical repeaters.

2. Background and Relevant Art

An underlying problem of optical networks is that optical signals carried by the optical networks are degraded during transmission for a wide variety of reasons. Signal noise, signal loss, signal attenuation, chromatic dispersion, and modal dispersion are examples of the deleterious effects experienced by optical signals in optical networks. Because optical signals degrade during transmission, the distance that an optical signal can be transmitted is limited. In addition, optical signals can only be transmitted a certain distance that may be related, for example, to the type of optical fiber (single mode, multi-mode, e.g.), the type of laser (Distributed Feedback Laser, Vertical Cavity Surface Emitting Laser, e.g.), type of data modulation, and the wavelength of the transmitted signal.

The distance that an optical signal can be transmitted can be increased using optical amplifiers such as erbium doped fiber amplifiers and semiconductor optical amplifiers. In fact, optical amplifiers can often be cascaded to increase the distance that optical signals can be transmitted. Without optical amplifiers, the ability to transmit optical signals could be limited. In spite of these advantages, optical amplifiers have several drawbacks that need improvement.

For example, optical amplifiers are often analog in nature and they therefore introduce noise into the optical signals. As noise is added to an optical signal, the likelihood of introducing errors or of being unable to read the optical signal increases. The problem of added noise becomes more pronounced when optical amplifiers are cascaded, because the noise accumulates at each optical amplifier. As a result, each subsequent optical amplifier, in addition to introducing new noise to the optical signal, amplifies the noise that was added by prior optical amplifiers. The addition of noise and the amplification of the added noise ultimately results in a corrupted optical signal.

In addition, the optical signal being amplified may include more than one channel (or wavelength of light), as is the case in Coarse Division Wavelength Multiplexing (CWDM), Dense Division Wavelength Multiplexing (DWDM), and other WDM systems. Unfortunately, optical amplifiers do not always provide the same amount of gain to each channel included in the optical signal. As a result, care must be taken to ensure that the gain of each channel is equalized or the distance that a particular optical signal can be transmitted decreases. In addition, the input of an optical amplifier should be within a particular range of optical power. Thus, optical amplifiers are often accompanied with variable optical attenuators to ensure that the optical signals are within the appropriate range.

Another problem associated with optical amplifiers is that they often lack scalability. Optical amplifiers, as noted above, are often configured to amplify more than one wavelength of light. When an optical amplifier fails, all of the channels of the optical signal are adversely affected. The optical amplifier cannot be fixed, but likely needs to be replaced. In other words, optical amplifiers are not pluggable.

Optical amplifiers are also unable to reset the jitter budget of an optical signal. In fact, this is one of the reasons that optical amplifiers, when cascaded to repeat optical signals, ultimately fail. The jitter budget is exhausted and the optical signal can no longer be recognized.

BRIEF SUMMARY OF THE INVENTION

These and other limitations are overcome by the present invention, which relates to systems and methods for transmitting optical signals and more particularly to a scalable transceiver based repeater for repeating optical signals in an optical network. One advantage of a scalable transceiver based optical repeater is that the components can be standards based and are thus less expensive to manufacture.

One embodiment of a scalable transceiver based repeater includes a base with one or more receptacles configured to receive transceivers. An optical signal (such as a Wavelength Division Multiplexed optical signal) that includes multiple channels is demultiplexed and each of the transceivers mounted in the receptacles receives a different channel. If a particular channel of the optical signal is not being used, there is no need to have a transceiver for that channel. This makes the repeater scalable and expandable as needed because transceivers can be added for other channels or wavelengths in the optical signal as the other channels or wavelengths of light are used. In addition, transceivers that fail can be replaced individually without having to replace other transceivers in the scalable repeater. Each transceiver therefore repeats a particular channel of the optical signal. More particularly, the lasers in the transceivers generate the wavelengths that correspond to the channels in the optical signal.

The channels are received by the receiver portions of the transceivers and the clock and data is typically recovered by a clock and data recovery (CDR) circuit. A switching module is used to redirect the channels back to the transmitter portions of the respective receivers. The switching module can also drop/add the channels. When dropping/adding channels, the switch does not simply redirect the channel from the receiver portion to the transmitter portion, but directs the channel to the drop output from the receiver portion of the transceiver and directs the add input to the transmitter portion of the transceiver.

As a channel received at a receiver portion of a transceiver is retransmitted by the transmit portion of the transceiver, the channel is converted to an electrical signal by the receiver, processed, and then converted back into an optical signal by the transmit portion. Advantageously, the transmitter regenerates the channel and effectively resets the jitter budget of the channel. Also, problems with noise accumulation and amplification in optical amplifiers is avoided as each channel is retransmitted by the transceivers at the various wavelengths. The transmitter portions of the transceivers may also be associated with a CDR circuit. The CDR circuit can help remove noise and reset the jitter budget of the channel. The scalable transceiver based repeater is scalable and pluggable.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to systems and methods for transmitting optical signals and more particularly to a scalable transceiver based repeater for repeating or retransmitting optical signals. In one embodiment, the repeater includes a transceiver for at least some of the channels or wavelengths in an optical signal. Each transceiver detects a particular channel (or wavelength) of an optical signal with an optical receive portion that is typically referred to as a receiver optical sub-assembly (ROSA). Each transceiver also has a corresponding transmit portion often referred to as a transmitter optical sub-assembly (TOSA) to transmit the wavelength of the channel received by the receive portion of the transceiver.

One of skill in the art can appreciate that as the channels, also referred to herein as signals, are processed by the ROSA or the TOSA, the channels or signals may take either an electrical or optical form. A ROSA, for example, receives and optical channel or wavelength and converts the optical channel into an electrical signal. The TOSA receives an electrical signal and generates an optical channel at a particular wavelength. The term channel is intended to represent an optical signal or wavelength even though it may be converted from an optical signal to an electrical signal or from an electrical signal to an optical signal. A channel further represents a signal associated with particular wavelength in either optical or electrical form.

The optical signals received by a transceiver based repeater may be regenerated and retransmitted by the transceivers. As a result, when transceiver based repeaters are cascaded, the noise that is added, for example, by cascaded optical amplifiers is eliminated because at each transceiver based repeater, the optical signal is effectively reset and much of the noise is removed. Advantageously, channels in the optical signal can also be dropped and added as needed at transceiver based repeaters.

One of the advantages of embodiments of the present invention is the scalability of a transceiver based repeater. The number of transceivers on a particular transceiver based repeater can vary according to system requirements. Because transceivers can be adapted to particular wavelengths, the number of transceivers on a particular repeater can be limited to the number of optical channels or wavelengths actually used. This can result in significant cost savings because transceivers are only needed for the channels being used, transceivers can be replaced individually, and additional transceivers can be added as needed. Expense can be reduced because standards based transceivers such as, by way of example and not limitation, XFP or SFP transceivers can be used.

For example, if only one channel or wavelength, as is currently the case is some systems, of a CWDM (or DWDM, or other multiplexed) optical signal is in use, then the repeater only needs a single transceiver to repeat the channel being used. The remaining channels of the CWDM optical signal are not being used and may not carry any data. The unused channels can be passed on by the repeater without concern because they contain no data and do not need to be repeated. In some instances, some of the channels may not be present in the CWDM optical signal.

Embodiments of the present invention, however, can accommodate the scenario when the channels available in the optical signal are needed. Embodiments of the transceiver based optical repeater provide receptacles or bays that are configured to receive additional transceivers as needed. Thus, the transceiver based repeater can be scaled by adding additional transceivers that correspond to other channels or wavelengths. Advantageously, if a particular transceiver of the transceiver based repeater fails, the failed transceiver can be replaced instead of replacing the entire repeater.

Figure 1:
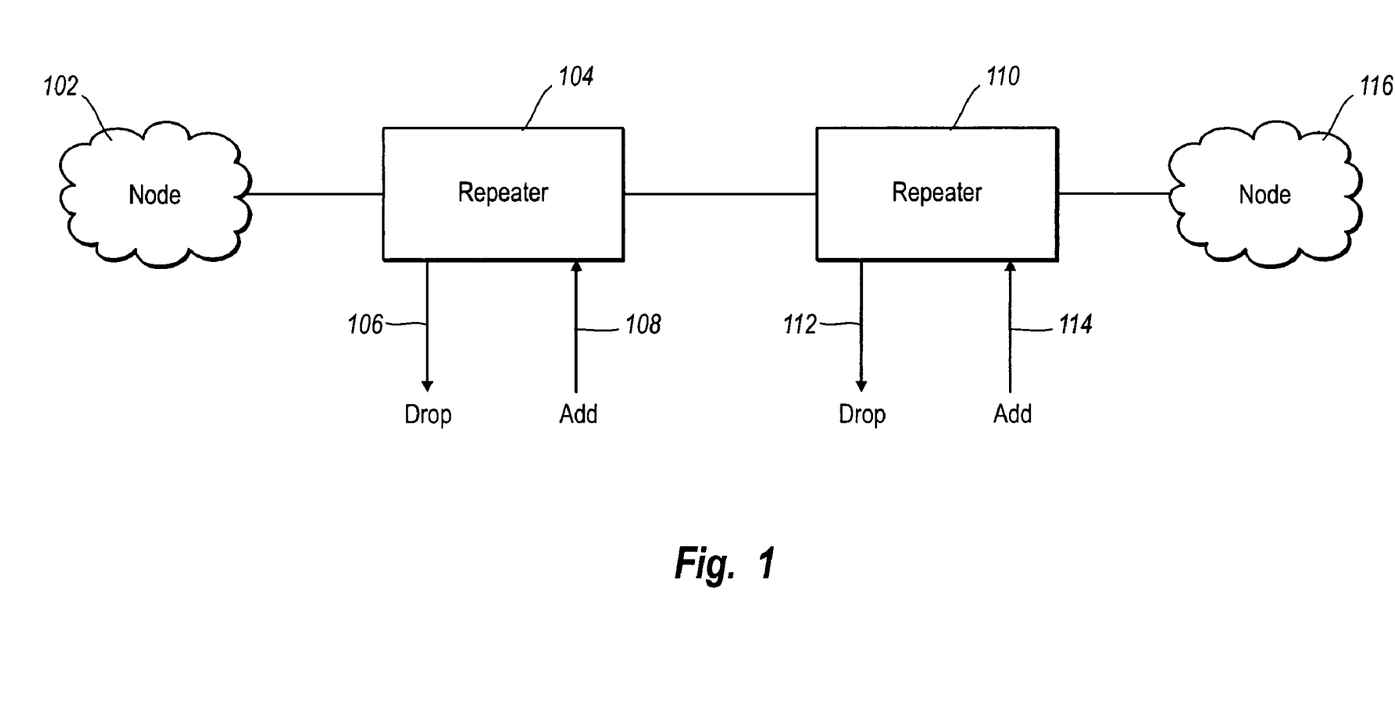
FIG. 1 illustrates an exemplary environment for implementing embodiments of the present invention.

FIG. 1 illustrates one example of an environment for implementing embodiments of the present invention. The network 100 illustrates a propagation path of optical signals from a node 102 to a node 116. The network 100 may propagate CWDM signals, DWDM signals, and like. Each node can represent a transmitter, a receiver, a host, a network, a recipient, or other optical device and the like or any combination thereof.

As an optical signal propagates from the node 102 to the node 116, the optical signal may degrade, attenuate, disperse, or otherwise become corrupted or unrecoverable as previously described. The transceiver based repeaters 104 and 110 ensure that the optical signal reaches its destination in the network 100 by repeating the optical signal or by repeating certain channels in the optical signal. Advantageously, the repeaters described herein repeat optical signals without introducing noise associated, for example, with optical amplifiers.

The transceiver based repeater 104, in addition to repeating the optical signal or channels included in the optical signal, may provide other functionality such as resetting a jitter budget, performing packet switching, providing add/drop functionality and the like. In this example, the repeater 104 has the ability to drop 106 certain channels/wavelengths or portions of the optical signal for use by other systems/networks/devices. The repeater 104, also adds 108 the wavelengths that were dropped back into the optical signal that is repeated on the network 100. The repeater 110 is similarly configured to the repeater 104 and also has the ability to drop 112 and add 114 specific channels or wavelengths. Note that the dropped or added channels may be in either an electrical or optical form. The transceiver based repeaters 104 can thus provided add/drop functionality in addition to repeating the optical signal.

Figure 2:
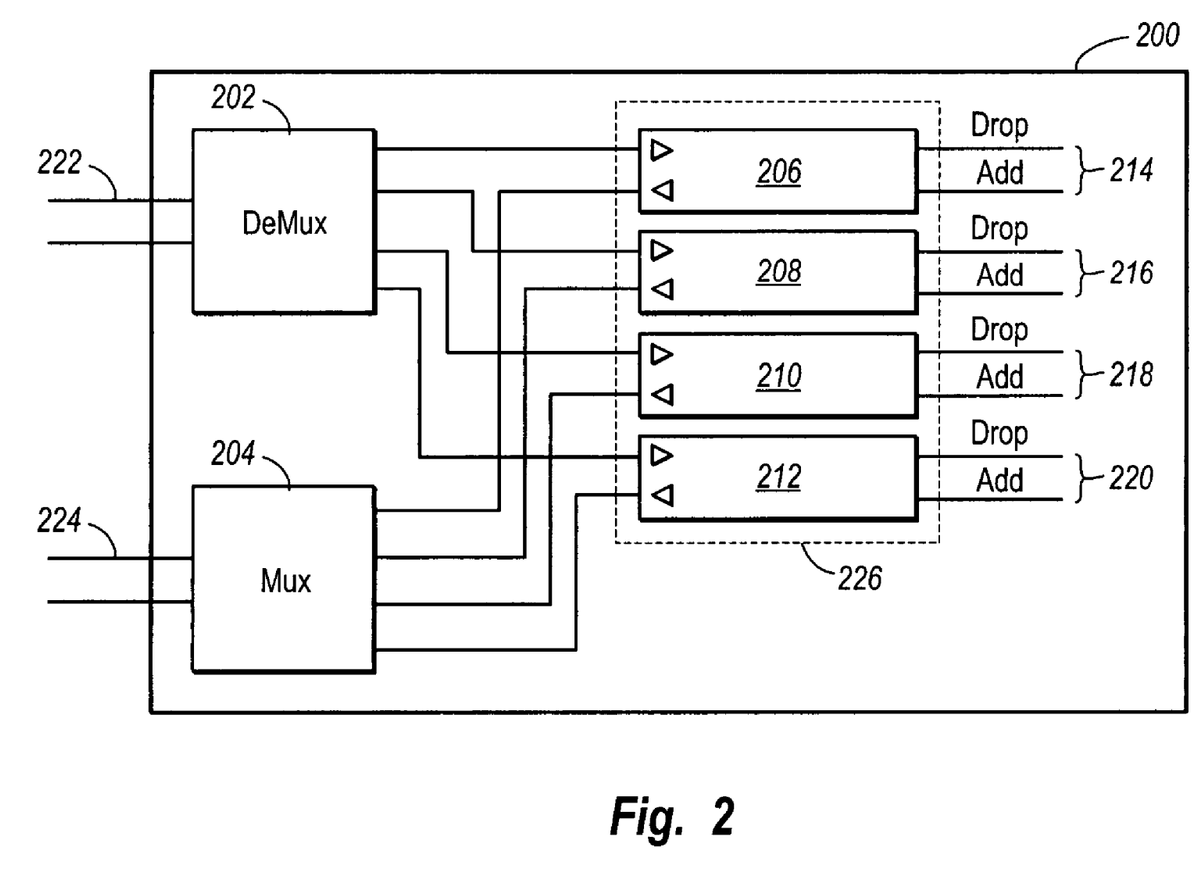
FIG. 2 is a block diagram of one embodiment of a scalable transceiver based repeater.

FIG. 2 illustrates a block diagram of a transceiver based repeater. In this example, the repeater 200 includes a demultiplexor (DEMUX) 202 that receives an optical signal 222. The DEMUX 202 separates the channels in the optical signal 222 and sends one channel to each transceiver 206, 208, 210, and 212. Each transceiver can add/drop their respective channel as illustrated by the add/drop connections 214, 216, 218, and 220. The channels are then re-transmitted by the transceivers 206, 208, 210, and 212. The channels are multiplexed together by the multiplexor (MUX) 204 and output as optical signal 224. The DEMUX 202 and the MUX 204 can be included as part of the transceiver based repeater or can be considered as external to the transceiver based repeater.

As previously stated, the channels that are added/dropped from the transceivers 206, 208, 210, and 212 are electrical signals. The drop signal in the transceiver 212, for example, was optically received by a photodiode and converted to an electrical signal. The add signal to the transceiver 212 is also in an electrical form and is converted to an optical form of a particular wavelength by a laser in the transmitter portion of the transceiver 212. In addition to adding or dropping a channel, the channel can be routed from the receiver portion to the transmit portion.

Figure 3:
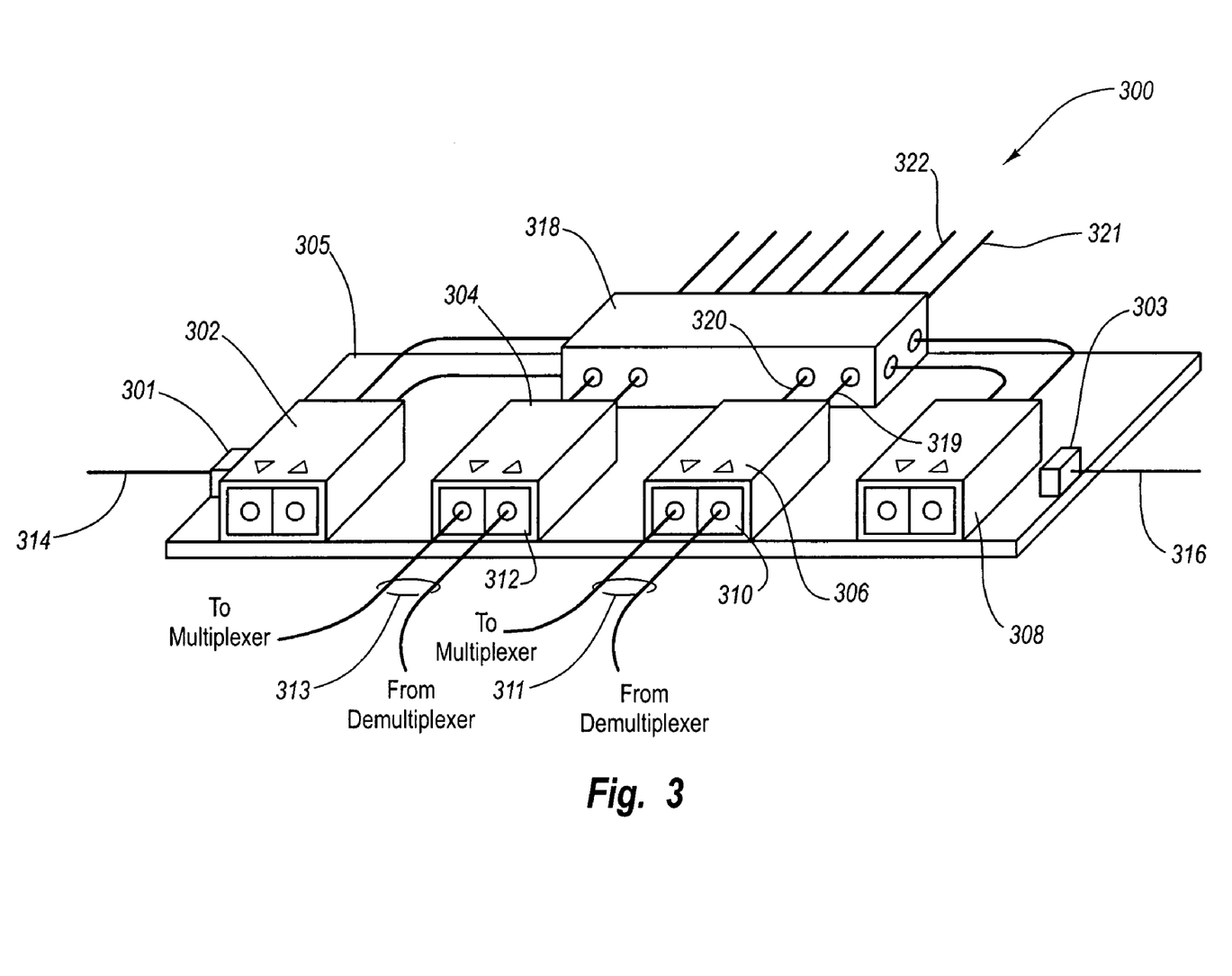
FIG. 3 illustrates a perspective view of one embodiment of a scalable transceiver based repeater and illustrates receptacles used to hold the transceivers.

FIG. 3 illustrates a perspective view of one embodiment of a transceiver based repeater 300. In this example, the transceiver receptacles 302, 304, 306, and 308 are mounted on a base or board 305. The board 305 may provide optical/electrical circuitry needed by the transceivers as is known to one of skill in the art. The optical/electrical circuitry may include multiplexors and/or demultiplexors. The input optical signal 314 is received through the connector 301 and is then demultiplexed. More specifically, the optical signal 314 is optically demultiplexed, in one embodiment, and each optical channel is sent to a different transceiver. Alternatively, the input optical signal 314 may have been previously demultiplexed, in which case the connector 301 accommodates an input for each channel. The connector 303 is similarly configured and provides an output connector for each channel or a single output for the output signal 316 if the repeater 300 also provides channel multiplexing.

In this example, the receptacles 302 and 308 are empty. The repeater 300 may include switches or other mechanisms for passing the channels through the repeater 300. A transceiver 312 is inserted in the receptacle 304 and a transceiver 310 is inserted in the receptacle 306. This illustrates the scalability of the transceiver based repeater 300 as well as the facility with which non-functional transceivers can be replaced. The signal pairs 311 and 313 represent optical signals that are received and retransmitted by the transceivers 310, and 312, respectively.

More specifically, a channel received by the receiver portion of the transceiver 312 is converted into an electrical signal and then electrically switched or routed back to the transmitter portion of the transceiver 312 using the switching module 318. The switching module 318 typically receives/provides the channels from/to the transceivers in an electrical form. The transmitter portion of the transceiver 312 converts the signal back to an optical form. For example, the switching module 318 can route the channel received by the receiver portion of the transceiver 310 back to the transmit portion of transceiver portion using the path 319 and the path 320.

Alternatively, the switching module can route the channel received over the path 319 to the drop port 321 and add the dropped channel through the add port 322 to the transceiver 310 through the path 320.

Figures 4, 5:
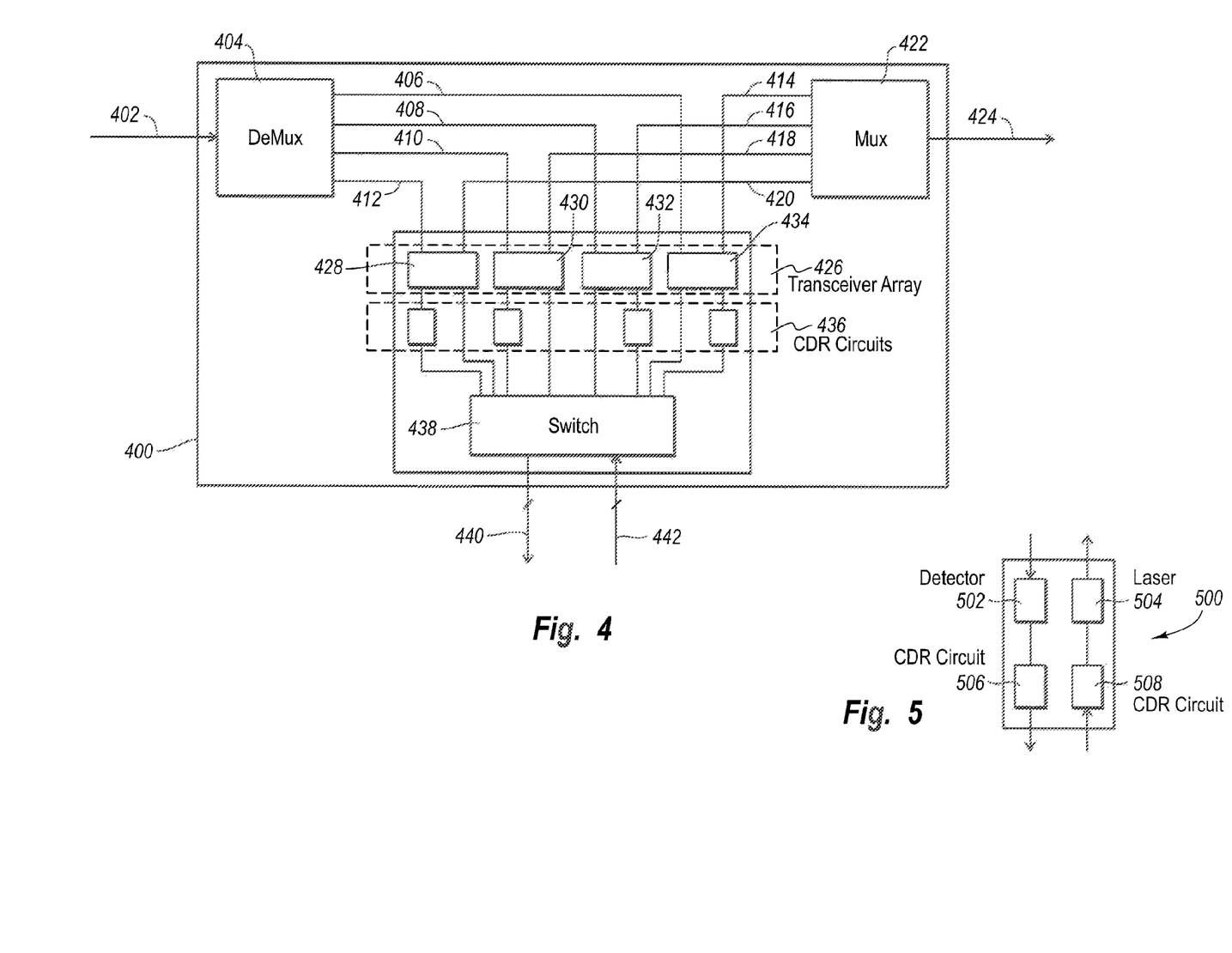
FIG. 4 illustrates another embodiment of a scalable transceiver based repeater and further illustrates a switch used to add/drop channels from the repeater and/or redirect channels from the receiver portion of a transceiver to the transmit portion of the transceiver.
FIG. 5 illustrates an example of a transceiver that includes a CDR for the optical receiver portion of a transceiver and a CDR for the transmit portion of the optical receiver.

FIG. 4 illustrates another embodiment of a scalable transceiver based repeater 400. The repeater 400 is described with reference to an optical signal 402 that includes four channels or wavelengths, although one of skill in the art can appreciate that the repeater 400 can be adapted to accommodate any number of channels or wavelengths. The repeating aspect of the repeater 400 is achieved in part by a transceiver array 426. The transceiver array 426 typically includes one transceiver for each channel or wavelength in the optical signal 402. As previously mentioned, the repeater can be scaled to accommodate more or less channels. This is accomplished in one embodiment by adding or removing transceivers from the repeater 400. If a transceiver for a particular channel is not present in the repeater, then the channel is usually passed through the repeater.

The signal 402 is received by a demultiplexer 404 that separates the signal 402 into respective wavelengths or channels 406, 408, 410, and 412. In this example, each channel is detected by the receiver portion of a different transceiver in the transceiver array 426. Thus, the channel 406 is detected by the transceiver 434, the channel 408 is detected by the transceiver 432, the channel 410 is detected by the transceiver 430 and the channel 412 is detected by the transceiver 428.

After the channels are detected or received by the transceivers in the transceiver array 426, clock and data recovery (CDR) is typically performed on the channels by the CDR circuits 436. At this point, the channels are typically in an electrical form. Next, an electrical switch 438 (such as a cross switch, for example) may be used to drop one or more signals or channels 440. The channels 440 that were dropped are also added through the switch 438 as the channels 442. In one embodiment, the switch 438 can route the added channels 442 to the appropriate transceiver. The switch 438 can also route or redirect a particular channel that is not dropped back to the appropriate transceiver. This embodiment of the repeater 400 converts the optical channels into electrical channels before dropping or adding is performed. However, the channels may also be dropped/added in an optical form.

Each transceiver in the transceiver array 426 also includes a laser that is configured to generate, in this embodiment, the wavelength of the channel that was received by the transceiver. The channels or wavelengths generated by the transceivers are multiplexed together by the multiplexer 422 to form the optical signal 424 that is transmitted by the repeater 400. The transceivers can generate the channels that were received at specific levels of power, thereby reducing or eliminating problems associated with gain equalization in optical amplifiers.

In the example of FIG. 4, the CDR circuits are illustrated as being separate from the transceiver modules. FIG. 5, however, illustrates another embodiment where the CDR circuits are integrated with the transceivers. FIG. 5 thus illustrates a transceiver 500 that includes a detector 502 and a corresponding CDR circuit 506 in the receive portion of the transceiver 500. In this example, the transmit portion of the transceiver 500 includes a CDR circuit 508 that is associated with the laser 504 in the transmit portion of the transceiver 500.

One advantage of using a CDR circuit 508 on the transmit portion of the transceiver 500 is to clean up the signal being transmitted to reduce phase noise and/or jitter. The CDR circuit 508 is also used to clean up signals that are added through the transceiver 500. For example, the added signal received from the cross switch or from a field programmable gate array (FPGA) or other source may have unacceptable noise or jitter. Including the CDR circuit 508 can ensure that the signal is transmitted in a relatively clean form.

The CDR circuit 508, in one embodiment, is a multi-rate bypass CDR circuit. A bypass CDR circuit permits the transceiver 500 to transmit signals that cannot be locked by the CDR circuit 508. In the presence of noise or signal loss, for example, optical channels that operate at lower rates are easier to detect than optical channels at higher bit rates. If the CDR circuit has a bypass mode, then optical channels operating at lower bit can still be transmitted even if clock and data recovery is not performed. If the CDR circuit does not lock, it can be bypassed. This enables the repeater to transmit at different data rates. In one embodiment, the channels or signals not locked by the CDR circuit 508 have a relatively lower frequency that is easier to detect. As a result, passing the signal or channel is less likely to result in an error.

The transceivers can be configured to operate in a loopback mode. An optical signal received by a scalable transceiver based repeater in loopback mode is received and then retransmitted. The CDR circuit on the transmit portion can reduce phase noise in this instance. Alternatively, an optical signal can be dropped and then added as previously described.

The CDR circuits included in a scalable transceiver based repeater can be used to retime the optical signals in addition to removing problems such as jitter and phase noise. The transmission distance associated with an optical signal is improved because transceiver based repeaters eliminate the problems associated with optical amplifiers. For example, noise is not added and amplified at successive stages. In one embodiment, an optical signal can be regenerated for 2500 kilometers before failure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In an optical network that carries an optical signal, the optical signal including one or more channels, a repeater for repeating the optical signal in the optical network, the repeater comprising:
    a first transceiver comprising:
        an optical receiver adapted to convert a particular channel in the optical signal to an electrical signal; and
        an optical transmitter adapted to convert the electrical signal back to the particular channel such that the particular channel is repeated on the optical network; and
    a plurality of receptacles each being configured to removably receive a transceiver such that a first one of the receptacles is configured to removably receive the first transceiver; and
    an electrical switch that is electrically connected with the first transceiver, wherein the switch is configured at least to direct the electrical signal from the optical receiver in the first transceiver back to an optical transmitter in the first transceiver,
    and wherein, in a first configuration of the repeater, the electrical switch includes an unused electrical path from the electrical switch to a second one of the plurality of receptacles in which a second transceiver is physically removed such that the electrical switch includes capacity to direct more signals than the repeater is configured to receive.

2. A repeater as defined in claim 1, wherein the switch is configured to drop the particular channel received by the optical receiver and to add the particular channel back to the optical signal.

3. A repeater as defined in claim 1, the optical receiver further comprising a first clock and data recovery circuit that recovers a clock and data from the particular channel received by the optical receiver and the optical transmitter further comprising a second clock and data recovery circuit that resets a jitter of the particular channel repeated by the optical transmitter.

4. A repeater as defined in claim 3, wherein the second clock and data recovery circuit is a multi-rate bypass clock and data recovery circuit that passes the channel when the clock and data recovery circuit cannot lock onto the channel.

5. A repeater as defined in claim 1, further comprising:
    a demultiplexor that receives the optical signal and separates the optical signal into one or more channels and delivers the particular channel to the optical receiver; and
    a multiplexor that multiplexes the particular channel repeated by the optical transmitter with at least one other channel in to the optical signal.

6. A repeater as defined in claim 1, wherein, in a second configuration of the repeater, a transceiver is present in each receptacle and the electrical switch does not include extra capacity to direct additional channels.

7. A repeater as defined in claim 1, the optical receiver further comprising:
    a pass-through mechanism configured to selectively pass an unreceived channel in the optical signal through the repeater when a number of channels in the optical signal exceeds a number of transceivers in the repeater.

8. A repeater as defined in claim 7, wherein the pass-through mechanism does not convert the unreceived channel into an electrical signal.

9. A repeater as defined in claim 7, wherein, in a second configuration of the repeater, the second transceiver is present in the second receptacle and receives the channel selectively passed by the pass-through mechanism.

10. In a system that transmits optical signals, a scalable repeater that can repeat one or more of the channels in an optical signal, the scalable repeater comprising:
    one or more receptacles mounted on a base, each receptacle configured to removably receive a transceiver;
    at least one transceiver mounted in one of the receptacles, wherein the at least one transceiver receives a channel from an optical signal received by the scalable repeater;
    a first clock and data recover (CDR) circuit that recovers a clock and data from the received channel;
    a switching module that is configured to direct the received channel back to the at least one transceiver or drop the received channel from the optical signal; and
    a second CDR circuit that retimes the channel and resets a jitter of the channel before the channel is repeated by a transmitter portion of the at least one transceiver;
    wherein, in a first configuration of the scalable repeater, the switching module includes an unused electrical path from the switching module to a second one of the plurality of receptacles in which a second transceiver is physically removed such that the switching module includes capacity to direct or drop more channels than the scalable repeater is configured to receive.

11. A scalable repeater as defined in claim 10, further comprising:
  a demultiplexor optically connected with the at least one transceiver to deliver the channel to the at least one transceiver; and
  a multiplexor optical connected with the at least one transceiver to multiplex channels transmitted by the at least one transceiver.

12. A scalable repeater as defined in claim 11, wherein, in the first configuration, the demultiplexor includes capacity to deliver more channels than the scalable repeater is configured to receive.

13. A scalable repeater as defined in claim 11, wherein, in the first configuration, the multiplexor includes capacity to multiplex more channels than the scalable repeater is configured to repeat.

14. A scalable repeater as defined in claim 10, wherein the first CDR circuit is a multi-rate bypass CDR and the second CDR circuit is a multi-rate bypass CDR that resets a jitter of at least a portion of the one or more channels and passes channels that cannot be locked by the second CDR circuit for transmission by the at least one transceiver.

15. A scalable repeater as defined in claim 10, wherein transceivers can be added or removed from the one or more receptacles.

16. A scalable repeater as defined in claim 10, wherein the number of channels the scalable repeater is configured to receive is dependent on a number of receptacles in which transceivers are present.

17. A scalable repeater as defined in claim 10, wherein, in a second configuration of the scalable repeater, a transceiver is received in each of the one or more receptacles and the switching module does not include extra capacity to direct or drop additional channels.

* * * * *

UNITED STATES PATENT AND TRADEMARK OFFICE
CERTIFICATE OF CORRECTION

| | |
|---|---|
| PATENT NO. | : 7,606,500 B2 |
| APPLICATION NO. | : 10/909614 |
| DATED | : October 20, 2009 |
| INVENTOR(S) | : Rudolf J. Hofmeister |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Twelfth Day of October, 2010

David J. Kappos
*Director of the United States Patent and Trademark Office*